US008015599B2

(12) United States Patent
Popp

(10) Patent No.: US 8,015,599 B2
(45) Date of Patent: *Sep. 6, 2011

(54) TOKEN PROVISIONING

(75) Inventor: Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/468,144

(22) Filed: May 19, 2009

(65) Prior Publication Data

US 2009/0274303 A1 Nov. 5, 2009

Related U.S. Application Data

(63) Continuation of application No. 10/782,751, filed on Feb. 23, 2004, now Pat. No. 7,548,620.

(51) Int. Cl.
G06F 7/04 (2006.01)
G06F 15/16 (2006.01)
G06F 17/30 (2006.01)
H04L 29/06 (2006.01)

(52) U.S. Cl. ............... 726/9; 726/10; 713/156; 713/173; 713/175; 380/273; 380/262; 380/282; 380/285; 725/25

(58) Field of Classification Search ................. 726/9, 10; 713/156, 173, 175; 380/273, 262, 282, 285; 725/25

See application file for complete search history.

(56) References Cited

U.S. PATENT DOCUMENTS

| 5,319,707 | A * | 6/1994 | Wasilewski et al. ........... 380/212 |
| 6,088,722 | A | 7/2000 | Herz et al. |
| 6,125,186 | A | 9/2000 | Saito et al. |
| 6,668,322 | B1 | 12/2003 | Wood et al. |
| 7,197,072 | B1 | 3/2007 | Hsu et al. |
| 7,209,560 | B1 | 4/2007 | Fairman et al. |
| 7,243,238 | B2 | 7/2007 | Watanabe et al. |
| 2002/0026574 | A1 | 2/2002 | Watanabe et al. |
| 2002/0131592 | A1 | 9/2002 | Hinnant |
| 2002/0144107 | A1 | 10/2002 | Sweeny et al. |
| 2002/0144119 | A1 | 10/2002 | Benantar |
| 2002/0199119 | A1 | 12/2002 | Dunnion et al. |
| 2003/0028664 | A1 | 2/2003 | Tan et al. |
| 2003/0061516 | A1 | 3/2003 | Yamaguchi et al. |

(Continued)

FOREIGN PATENT DOCUMENTS

EP 1 267 516 12/2002

(Continued)

OTHER PUBLICATIONS

Menezes, Alfred J. et al. Handbook of Applied Cryptography, 1997 CRC Press, LLC, pp. 543-590.*
English translation of OA dated Nov. 25, 2008 issued in JP Application No. 2007-500914.
Masahiro Noji, "Prevention of unauthorized access from remote locations, ASCII NT," ASCII Corporation, Sep. 1, 1998, vol. 3, No. 9, pp, 126-129 (partial translation).

(Continued)

Primary Examiner — Michael J Simitoski
(74) Attorney, Agent, or Firm — Morris & Kamlay LLP

(57) ABSTRACT

A method for provisioning a device such as a token. The device issues a certificate request to a Certification Authority. The request includes a public cryptographic key uniquely associated with the device. The Certification Authority generates a symmetric cryptographic key for the device, encrypts it using the public key, and creates a digital certificate that contains the encrypted symmetric key as an attribute. The Certification Authority sends the digital certificate to the device, which decrypts the symmetric key using the device's private key, and stores the decrypted symmetric key.

15 Claims, 4 Drawing Sheets

U.S. PATENT DOCUMENTS

2003/0093667 A1 5/2003 Dutta et al.
2003/0217270 A1 11/2003 Nakayama

FOREIGN PATENT DOCUMENTS

| | | |
|---|---|---|
| GB | 2 317 983 | 4/1998 |
| JP | 2002-077147 | 8/2000 |
| JP | 2003-337923 | 5/2002 |
| WO | WO 03001736 A1 | 1/2003 |

OTHER PUBLICATIONS

European Search Report, Dated Nov. 10, 2008, 2 pages.
RSA Security, Inc. "Strong Enterprise User Authentication: RSA ACE/Server", 1999, RSA Security, Inc.
International Preliminary Report on Patentability dated Aug. 30, 2006, including Written Opinion and International Search Report dated Jun. 8, 2005 (Five pages).

* cited by examiner

Prior Art

Version
Serial Number
Signature Algorithm ID
Issuer Name
Validity Period
Subject Name
Subject Public Key Info
Signature (by CA)

Figure 1

TOKEN PROVISIONING

This application is a continuation of application Ser. No. 10/782,751 filed Feb. 23, 2004 now U.S. Pat. No. 7,548,620, entitled "Token Provisioning", the content of which is hereby incorporated herein by reference.

FIELD OF THE INVENTION

The field of the invention is information security, and in particular provisioning a token with a secret that can be used by the token to generate a plurality of One Time Passwords.

BACKGROUND OF THE INVENTION

A common step in deciding whether to grant a request for access to data or services in a network is to identify and authenticate the requesting user. Authentication includes the process of verifying the identity of a user. A known identification and authentication system includes associating a user identifier ("user id") and a secret ("password") for a user. The password can be a secret shared between the user and an authentication service. The user can submit his user id and password to the authentication service, which compares them with a user id and associated password that can be stored at the service. If they match, then the user is said to have been authenticated. If not, the user is said not to be authenticated.

A token is a device that can be used to authenticate a user. It can include one or more secrets, some of which can be shared with a validation center. For example, a token can store a secret key that can be used as the basis for calculating a One Time Password (OTP). A OTP can be a number (or alphanumeric string) that is generated once and then is not reused. The token can generate an OTP and send it along with a unique token serial number to an authentication server. The authentication server can calculate an OTP using its copy of the secret key for the token with the received serial number. If the OTPs match, then the user can be said to be authenticated. To further strengthen the link from the user to the token, the user can establish a secret Personal Identification Number (PIN) shared with the token that must be entered by the user to unlock the token. Alternatively, the PIN can be shared between the user, the token and the authentication server, and can be used with other factors to generate the OTP. A token typically implements tamper-resistant measures to protect the secrets from unauthorized disclosure.

The Public Key Infrastructure (PKI) includes a combination of software, encryption technologies, and services that can use digital certificates, public-key cryptography, and certificate authorities to provide security services, such as certificate (including key) management, identification and authentication, ensure data integrity and confidentiality, non-repudiation, etc. PKI is governed by standards to ensure that PKI-enabled devices and systems can interoperate properly in various contexts. See, e.g., *ITU-T X.509*; A. Arsenault and S. Turner, *Internet X.509 Public Key Infrastructure: Roadmap*, draft-ietf-pkix-roadmap-09.txt, July 2002; R. Housley, W. Ford, W. Polk and D. Solo, *RFC 2459. Internet X.509 Public Key Infrastructure, Certificate and CRL Profile*, January 1999; and D. Richard Kuhn, Vincent C. Hu, W. Timothy Polk and Shu-Jen Chang, *Introduction to Public Key Technology and the Federal PKI Infrastructure*, National Institute of Standards and Technology, Feb. 26, 2001. A typical PKI includes the issuance of digital certificates to individual users and devices; end-user and end-device enrollment software; integration with certificate directories; and tools for managing, renewing and revoking certificates.

A PKI system uses digital certificates to provide certain security services, such as distributing and verifying cryptographic keys. A digital certificate can include a user's name and/or token identifier, a serial number, one or more expiration dates, a copy of the certificate holder's public key (which can be used for encrypting and decrypting messages and creating digital signatures), and the digital signature of a Certification Authority ("CA") so that a recipient of the certificate can verify that the certificate is valid. See, e.g., Adams, C., Farrell, S., *Internet X.509 Public Key Infrastructure Certificate Management Protocols*, <draft-ietf-pkix-rfc2510bis-06.txt>, December 2001. Digital certificates can be stored in registries so that users' public keys can be found and used by others. An example of a known PKI digital certificate format is shown in FIG. 1.

In certain known systems, a token is initialized at the manufacturer, e.g., by embedding in the token a secret symmetric key (to be shared with a validation authority) at the time and place at which the token is made. If it is learned that the token has compromised, it is disabled. It can be difficult or impossible to "reprovision" the token with a secret, e.g., recover the token, embed a new key, and to reissue the token to a user. Even if the token has not been compromised, the repeated use of the same key may render the OTPs generated by the token less secure than if its key was changed from time to time. Further, certain known token systems that are not PKI-enabled do not efficiently or effectively interoperate with a PKI system. Thus, certain known non-PKI token systems are unable to take advantage of the capabilities offered by PKI, such as key management, PKI-based authentication, etc.

BRIEF DESCRIPTION OF THE DRAWINGS

FIG. 1 shows a prior art embodiment of a known PKI certificate format.

DETAILED DESCRIPTION

Figure 2:
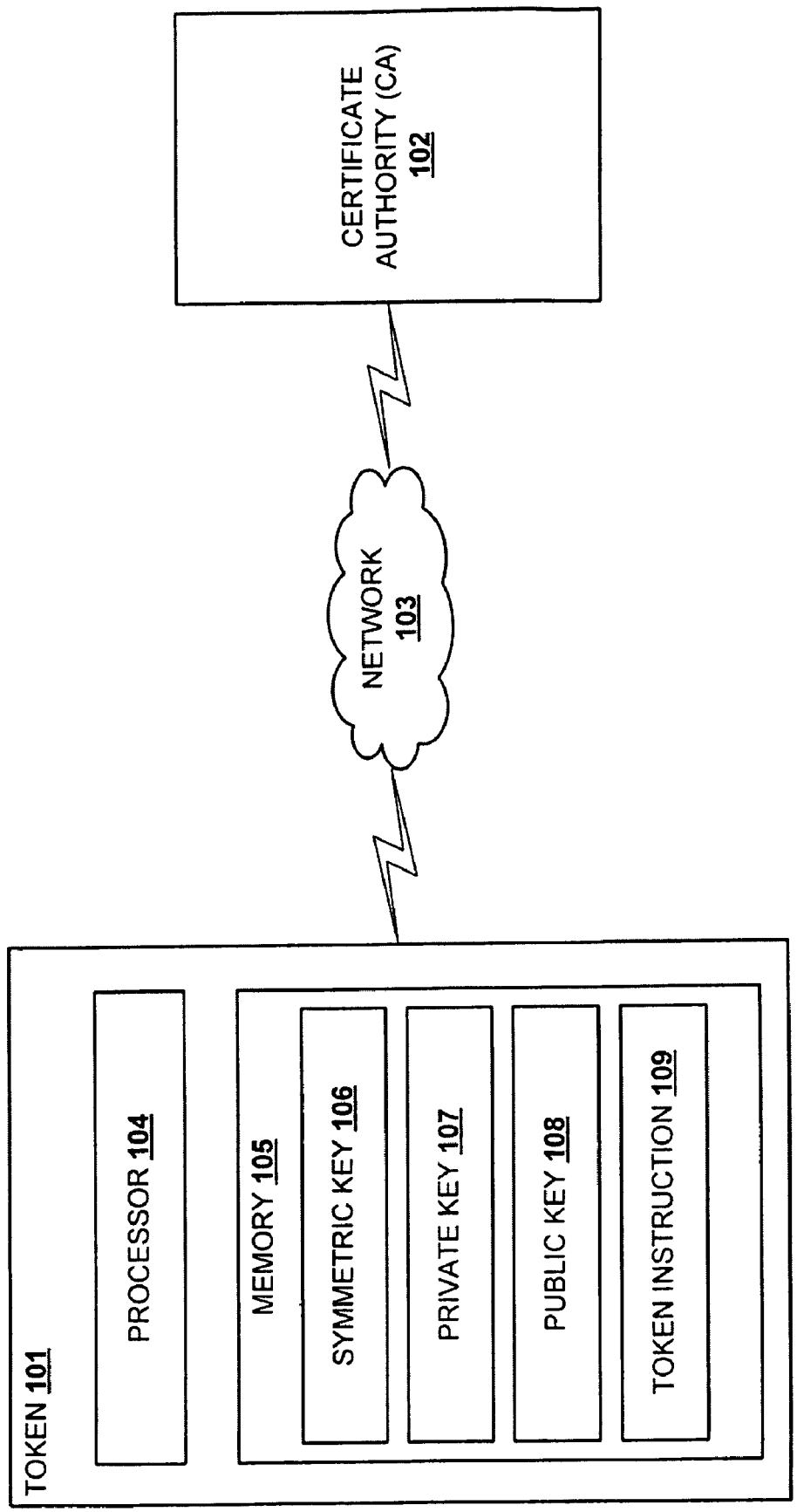
FIG. 2 shows a system in accordance with an embodiment of the present invention.

Embodiments of the present invention can advantageously enable a token to use a PKI for security services, such as reprovisioning the token's OTP secret. A system in accordance with an embodiment of the present invention is shown in FIG. 2. A token 101 is coupled to a Certification Authority (CA) 102 that can also act as an authentication server, through a network, 103. Token 101 includes a token processor 104 coupled to a token memory 105. Token processor 104 can be an Application Specific Integrated Circuit that embodies at least part of the method in accordance with an embodiment of the present invention in hardware and/or firmware. An example of an ASIC is a digital signal processor. Token processor 104 can also be a general purpose microprocessor, such as the Pentium TV processor manufactured by the Intel Corporation of Santa Clara, Calif. Token memory 105 can be any device adapted to store digital information, such as Read Only Memory (ROM), Electronically Erasable Read Only Memory (EEPROM), Random Access Memory (RAM), a hard disk, flash memory, etc.

Token memory 105 can store a symmetric cryptographic key 106, a private cryptographic key 107, and a public cryptographic key 108. These secrets can be stored more securely by implementing tamper resistant features for token memory

105, as is known in the art. Token memory 105 can also store Token Instructions 109 adapted to be executed by token processor 104 to perform functions such as OTP generation, communication with the validation center, communication with the CA, communication with application programs with which the token interoperates, etc.

Figure 3:
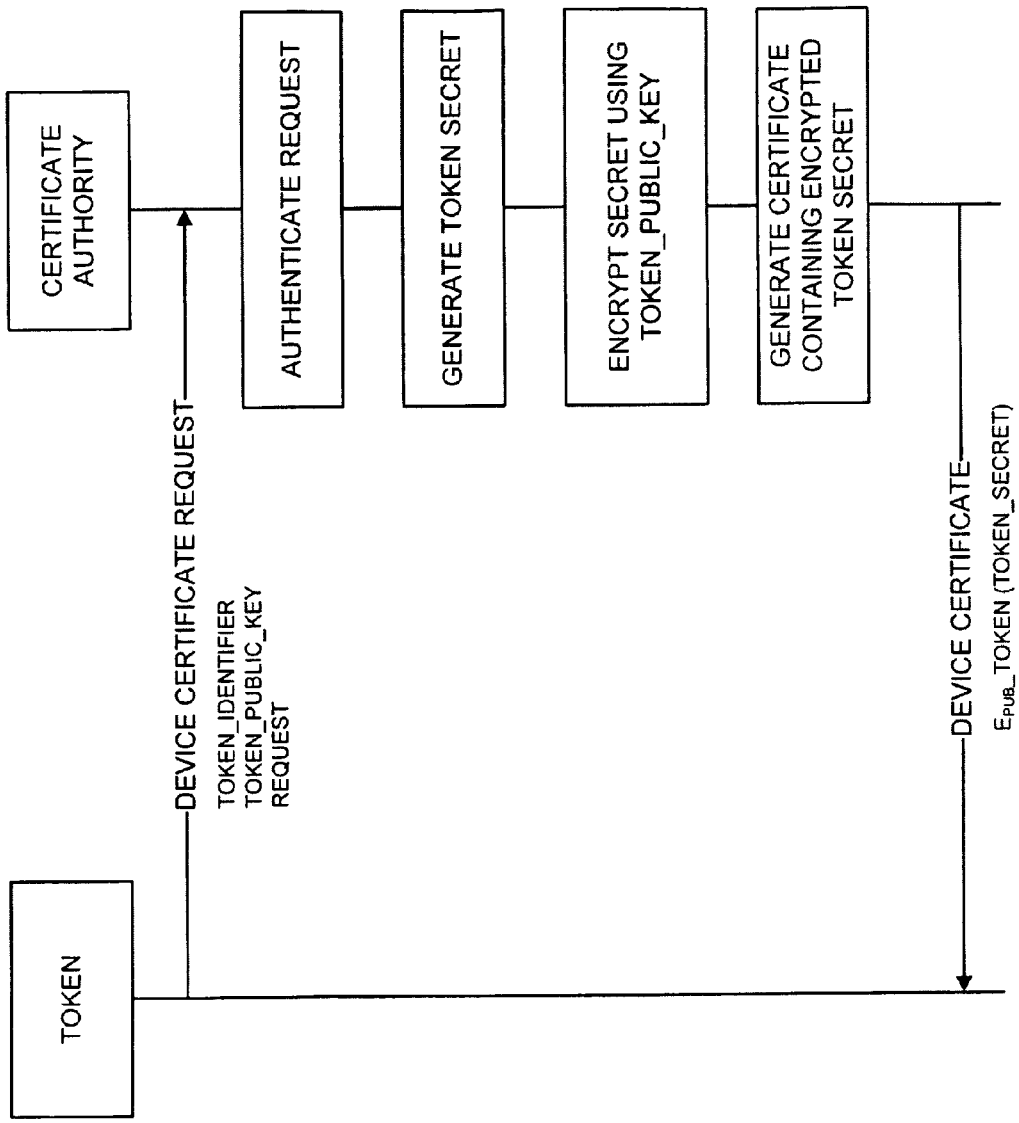
FIG. 3 shows the method in accordance with an embodiment of the present invention.

The method in accordance with an embodiment of the present invention is shown in FIG. 3. A token (the "Requesting Token") can send a device certificate request to a CA. The device certificate request can include a token identifier, a copy of a public key stored at the token, and a request for a certificate. The public key can be generated (along with the corresponding private key) at the token, or can be generated by a third party (e.g., the token manufacturer, the token issuer, etc.) and stored at the token. The CA can authenticate the request, generate a secret (the "OTP Secret") that can be used by the token to generate OTPs, encrypt the OTP Secret using the public key received from the token. The CA can also generate a certificate that can include the public key received from the token, the encrypted OTP secret, and a digital signature that is based upon a secret asymmetric key of the CA, and send the certificate back to the Requesting Token. The signature generated by the CA can be of the public key received from the token, of the OTP Secret, etc. There can be more than one such digital signature in the certificate. The CA can then send the device certificate back to the Requesting Token.

The Requesting Token can store the certificate received from the CA and decrypt the OTP Secret using the Token's private key. The Requesting Token can store the OTP Secret. The stored OTP Secret can then be used by the Requesting Token to generate OTPs. In this way, a token can advantageously be provisioned with a certificate and an OTP certificate through a certificate request to a PKI CA. Thus, a set of tokens can be reprovisioned by an enterprise security administrator, e.g., the OTP Secrets in an enterprise's tokens can be set not just the manufacturer, but by the enterprise itself. Thus, for example, the OTP Secrets can be reprovisioned from time to time by the enterprise to enhance system security.

In one embodiment of the present invention, the same OTP Secret can be used to generate many OTPs by varying other parameters (e.g., time, counters, etc.) that can be used in conjunction with the OTP Secret to generate the OTPs. Alternatively, the OTP Secret can be modified each time an OTP is generated using an appropriate cryptographic algorithm. For example, an OTP Secret can be hashed using an algorithm such as MD-5 to form a new OTP Secret for generating an OTP. This process can be repeated each time an OTP is generated. An OTP itself can be used as an input to generating a new version of the OTP Secret. A PIN can be used to form the OTP.

A user may forget his PIN, in which case the token cannot be used to generate authenticating OTPs. In certain known systems, an administrative key (hereinafter, "Admin Key") distinct form the OTP Secret is stored in the token. The Admin Key is used to unlock the private key embedded in a token whose user has forgotten his PIN. In accordance with an embodiment of the present invention, the OTP Secret can be used to unlock the token private key. In one embodiment of the present invention, an OTP is generated based upon the number of requests for an OTP at the token (an integer, hereinafter "Token Count"). In other words, OTP=F(Token Count), where F can be a function. In an embodiment of the present invention, the private key of a token can be unlocked using OTP(Token Count+N), where N is an integer, e.g., 10,000, 125,000, 1,234,567, etc. This advantageously reduces the number of keys that have to be stored in the token, i.e., by eliminating the need to store a distinct Admin Key at the token. It also reduces the number of keys that have to be managed in the system.

In an embodiment of the present invention, a trusted smart card (e.g., a smart card with tamper-resistant features) can store an OTP_Secret (i.e., a token secret), a public key, a private key, and software that runs a PKI agent. The smart card can operate in a legacy environment, e.g., in conjunction with a mainframe application that does not implement PKI. It can be easier to adapt a non-PKI-enabled application to authenticate users based upon a OTP than changing the legacy application to make it PKI-enabled. The smart card can send a device certificate request to the CA. Here, the CA can operate as a single platform capable of supporting both PKI requests and provisioning OTP systems. The certificate request can include the smart card's public key. The CA can generate OTP_Secret', encrypt it using the smart card's public key, digitally sign information including the smart card's public key, includes the encrypted OTP_Secret' and the signature in a PKI device certificate, and can send the device certificate to the smart card. The smart card can decrypt OTP_Secret' using the smart card's private key, and replaces OTP_Secret with OTP_Secret'. In this way, the smart card has used the PKI to reprovision its OTP secret. The smart card can use OTP_Secret' to generate OTPs to authenticate the holder of the smart card to the legacy application. For example, upon receiving a request for services along with an OTP, the legacy application can forward the OTP to the CA (which can act as an authentication server) for validation. If the CA determines that the OTP is valid, it can send a message indicating the same to the legacy application. If the OTP is determined not to be valid by the CA, the CA can send a message to the legacy application indicating that the requester has not been validated, and the requested services may be denied. In this way, a legacy system that includes parts that are not PKI-enabled (e.g., the legacy mainframe application) can benefit from PKI services.

Figure 4:
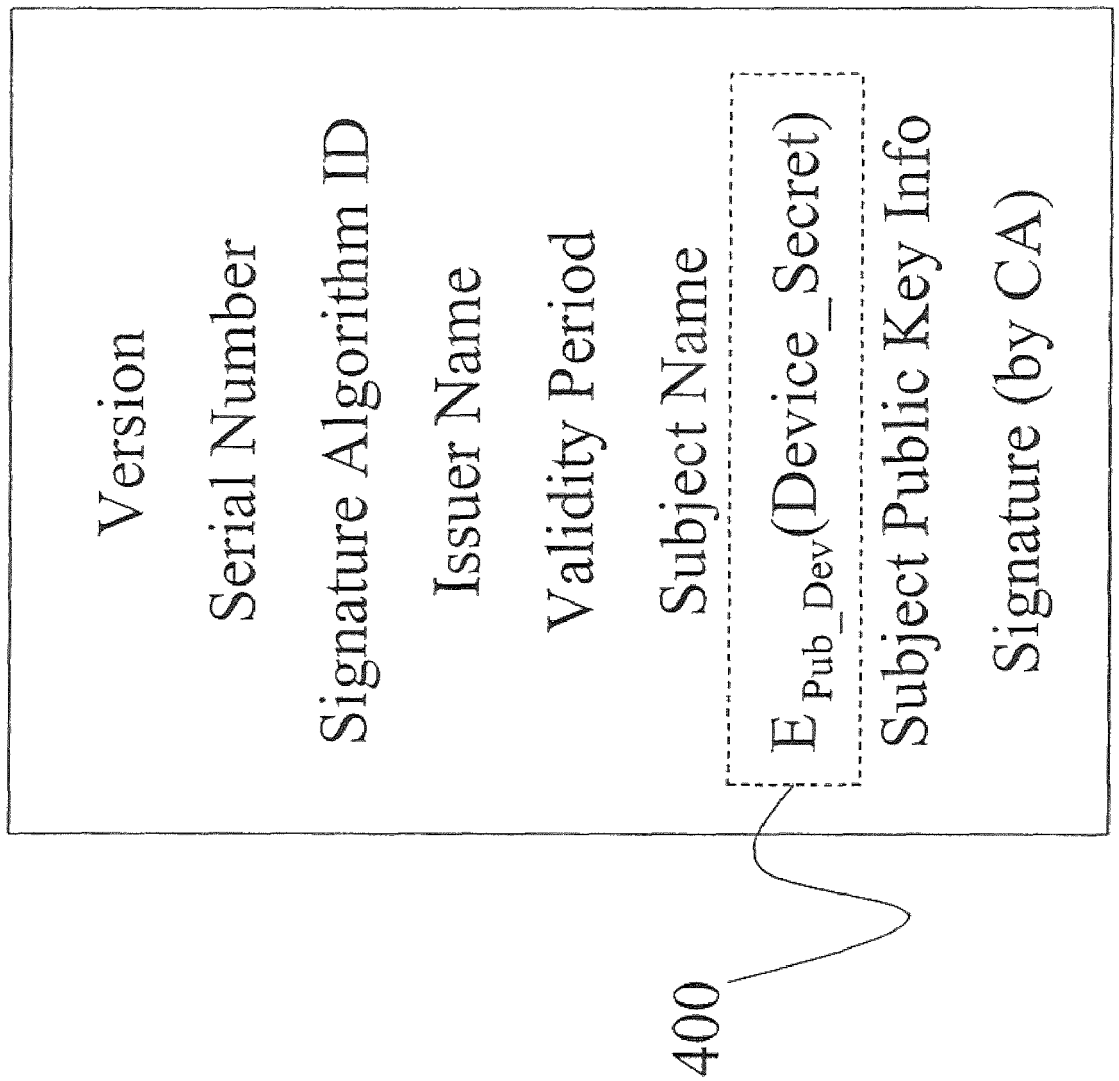
FIG. 4 shows a digital certificate in accordance with an embodiment of the present invention.

An embodiment of a certificate in accordance with an embodiment of the present invention is shown in FIG. 4. It contains as an attribute $E_{pub\_dev}$(device_secret), which can be a token secret encrypted by function E using a public key associated with a token, i.e., the function $E_{pub\_dev}$. The function E can be, for example, the RSA public key cryptographic algorithm known in the art, the Diffie-Hellman algorithm, or any suitable asymmetric algorithm. The key used in conjunction with E can be a public key uniquely associated with a particular device, such as a token. The device can store the corresponding private key, which should not be disclosed or otherwise known outside of the device. The device need not be a token, but can be any electronic device that can store a cryptographic key.

What is claimed is:

1. A method for reprovisioning a token having a first secret, comprising:
 sending a request for a certificate;
 receiving a certificate comprising:
  a second secret encrypted with a public key of the token, the second secret distinct from the first secret;
  a public key received from the token; and
  a digital signature based upon a secret asymmetric key of the recipient of the request for the certificate;
 decrypting the second secret with a private key of the token;
 replacing the first secret with the second secret;
 generating a one time password based on the second secret; and sending the one time password based on the second secret to an authentication server to authenticate a user.

2. The method of claim 1, wherein the certificate is an X.509 certificate.

3. The method of claim 1, wherein the request for a certificate is sent from a PKI enabled device to a PKI certificate authority.

4. The method of claim 1, wherein the one time password based on the second secret is further based on a personal identification number.

5. The method of claim 1, wherein the one time password based on the second secret is further based on a signal from a clock.

6. The method of claim 1, wherein the one time password based on the second secret is further based on a counter value.

7. A token for generating one time passwords, comprising:
a processor; and
a memory coupled to the processor, the memory storing a first secret and token instructions adapted to be executed by the processor to send a message that includes a request for a certificate, receive a certificate, replace the first secret with a second secret including storing the second secret in memory, generate a one time password based on the second secret, and send the one time password based on the second secret to an authentication server to authenticate a user,
wherein the certificate comprises:
the second secret encrypted with a public key of the token, the second secret distinct from the first secret;
a public key received from the token; and
a digital signature based upon a secret asymmetric key of the recipient of the request for the certificate.

8. The token of claim 7, wherein the token instructions are further adapted to be executed by the processor to generate the one time password based on a personal identification number.

9. The token of claim 7, wherein the token instructions are further adapted to be executed by the processor to generate the one time password based on the second secret and a time value.

10. The token of claim 7, wherein the token instructions are further adapted to be executed by the processor to generate the one time password based on the second secret and a counter value.

11. The token of claim 7, wherein the certificate is an X.509 certificate.

12. The token of claim 7, wherein the request for a certificate is sent from a PKI enabled device to a PKI certificate authority.

13. A token for generating one time passwords, comprising:
a processor; and
a memory coupled to the processor, the memory separately storing;
a first secret for generating one time passwords;
a private key;
a public key; and
token instructions adapted to be executed by the processor to send a message that includes a request for a certificate, receive a certificate, decrypt a second secret with the private key of the token, replace the first secret with the second secret, generate a one time password based on the second secret, and send the one time password to an authentication server to authenticate a user,
wherein the certificate comprises:
the second secret encrypted with the public key of the token, the second secret distinct from the first secret;
a public key received from the token; and
a digital signature based upon a secret asymmetric key of the recipient of the request for the certificate.

14. The token of claim 13, wherein the certificate is an X.509 certificate.

15. The token of claim 13, wherein the request for a certificate is sent from a PKI enabled device to a PKI certificate authority.

* * * * *